(12) United States Patent
Williams et al.

(10) Patent No.: US 9,090,181 B2
(45) Date of Patent: Jul. 28, 2015

(54) CHILD SAFETY SEAT

(75) Inventors: Bruce L. Williams, Narvon, PA (US); Gregory S. Sellers, Christiana, PA (US); Curtis M. Hartenstine, Birdsboro, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 483 days.

(21) Appl. No.: 13/531,625

(22) Filed: Jun. 25, 2012

(65) Prior Publication Data

US 2012/0326474 A1 Dec. 27, 2012

Related U.S. Application Data

(60) Provisional application No. 61/571,410, filed on Jun. 27, 2011.

(51) Int. Cl.
*B60N 2/20* (2006.01)
*B60N 2/28* (2006.01)
*B60N 2/235* (2006.01)
*B60N 2/22* (2006.01)
*B60N 2/12* (2006.01)

(52) U.S. Cl.
CPC ............ *B60N 2/2821* (2013.01); *B60N 2/2356* (2013.01); *B60N 2/2845* (2013.01); *B60N 2/2854* (2013.01); *B60N 2/2863* (2013.01); *B60N 2/12* (2013.01); *B60N 2/20* (2013.01); *B60N 2/22* (2013.01)

(58) Field of Classification Search
CPC .......... B60N 2/22; B60N 2/20; B60N 2/2356; B60N 2/12; B60N 2205/50; B60N 2/2252; B60N 2/206; B60N 2/682; B60N 2/23; B60N 2/235; B60N 2/366; B60N 2/1615; B60N 2/2222; B60N 2/2848; B60N 2/2812
USPC .................. 297/250.1, 256.16, 440.22, 183.3
See application file for complete search history.

(56) References Cited

U.S. PATENT DOCUMENTS

| 4,707,024 A | 11/1987 | Schrader |
| 5,478,135 A * | 12/1995 | Kain .......................... 297/256.16 |
| 5,499,831 A | 3/1996 | Worth et al. |
| 5,609,393 A | 3/1997 | Meeker et al. |

(Continued)

FOREIGN PATENT DOCUMENTS

| CN | 201012697 Y | 1/2008 |
| CN | 201280150 Y | 7/2009 |
| CN | 201665233 Y | 12/2010 |

*Primary Examiner* — Joshua J Michener
*Assistant Examiner* — Matthew Gitlin
(74) *Attorney, Agent, or Firm* — David I. Roche; Baker & McKenzie LLP

(57) ABSTRACT

A child safety seat comprises a seat shell, two first latches, two second latches and a release handle. An underside of the seat shell has two protruding rails, each of which having an inner side surface facing a gap delimited between the two rails, and an outer side surface opposite to the inner side surface. The two first latches are assembled with the rails, and respectively protrude from the inner side surfaces of the two rails to engage with a base. The two second latches are assembled at positions adjacently opposite to the first latches, and respectively protrude from the outer side surfaces of the two rails to engage with a stroller frame. The release handle is operatively connected with the first and second latches at the two rails, and is operable to switch the first and second latches from a locking to unlocking state.

25 Claims, 20 Drawing Sheets

(56) References Cited

U.S. PATENT DOCUMENTS

| | | | |
|---|---|---|---|
| 5,676,386 A | 10/1997 | Huang | |
| 6,017,088 A | 1/2000 | Stephens et al. | |
| 6,260,903 B1 * | 7/2001 | von der Heyde | 296/24.46 |
| 6,715,828 B1 * | 4/2004 | Cheng | 297/183.3 |
| 7,472,955 B2 * | 1/2009 | Crane et al. | 297/256.16 |
| 7,931,338 B2 * | 4/2011 | Lindsay | 297/378.13 |
| 8,544,952 B2 * | 10/2013 | Keegan et al. | 297/256.16 |
| 8,567,867 B2 * | 10/2013 | Arnold et al. | 297/383 |
| 8,678,498 B2 * | 3/2014 | Heisey | 297/256.16 |
| 8,876,208 B2 * | 11/2014 | Heisey et al. | 297/256.16 |
| 8,882,196 B2 * | 11/2014 | Williams et al. | 297/256.16 |
| 2002/0145318 A1 * | 10/2002 | Asbach et al. | 297/250.1 |
| 2004/0207243 A1 * | 10/2004 | Sedlack | 297/256.16 |
| 2005/0264062 A1 * | 12/2005 | Longenecker et al. | 297/250.1 |
| 2010/0207436 A1 * | 8/2010 | Karremans et al. | 297/256.16 |
| 2011/0074194 A1 * | 3/2011 | Weber et al. | 297/256.13 |
| 2011/0233978 A1 * | 9/2011 | Clement et al. | 297/256.13 |
| 2012/0013159 A1 * | 1/2012 | Williams et al. | 297/256.16 |

* cited by examiner

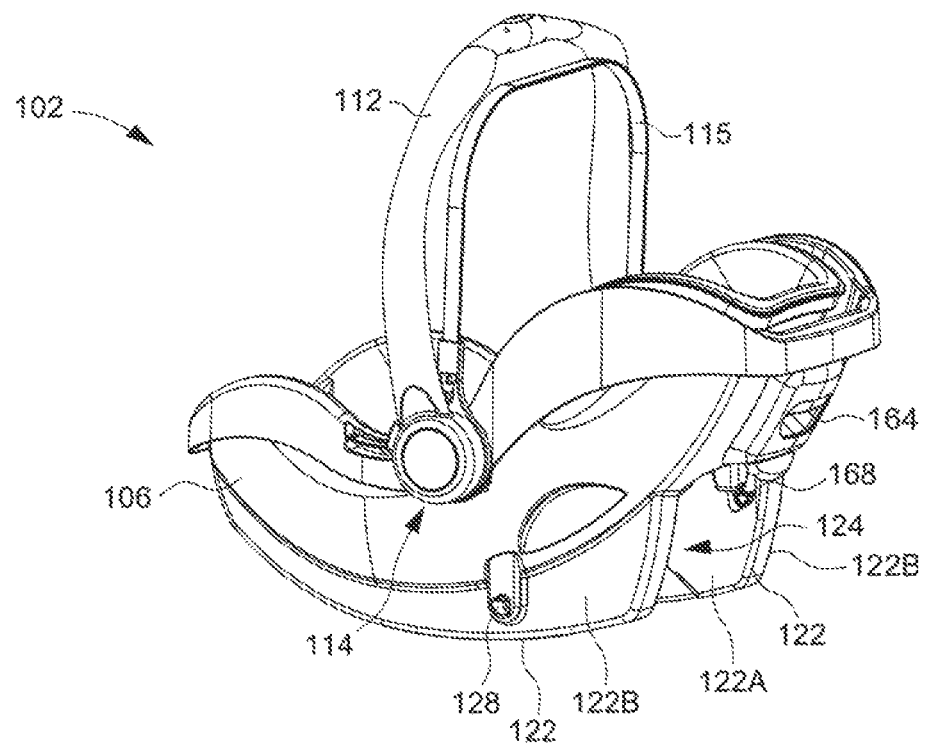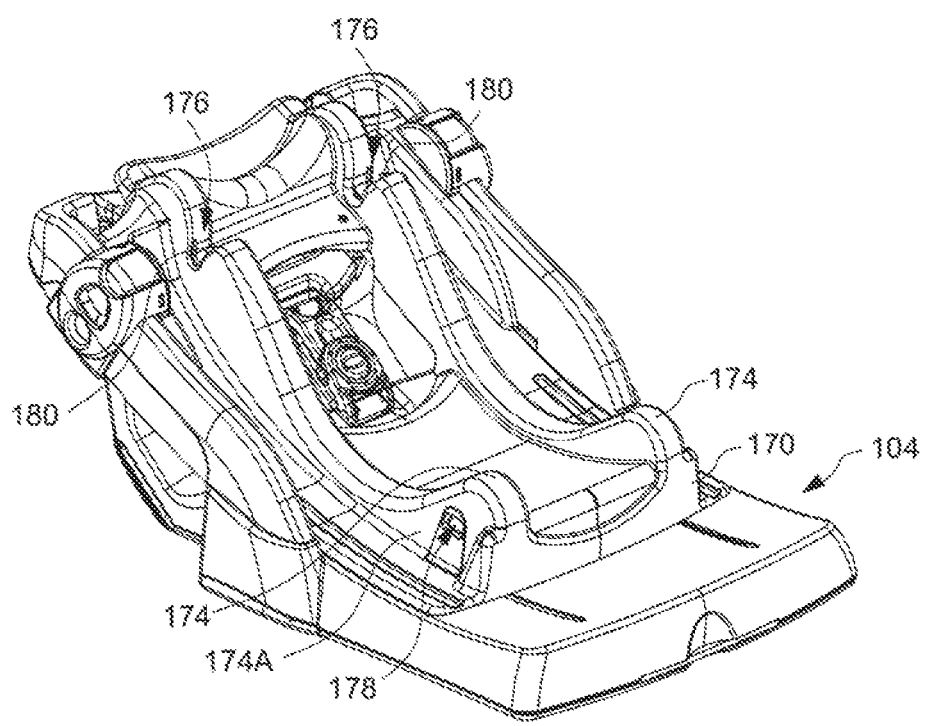
FIG. 2

US 9,090,181 B2

CHILD SAFETY SEAT

CROSS-REFERENCE TO RELATED APPLICATION

This patent application claims priority to U.S. Provisional patent Application No. 61/571,410 filed on Jun. 27, 2011.

BACKGROUND

1. Field of the Invention

The present inventions relate to child safety seats suitable for use in combination with a base and stroller frame.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. As a result, safety legislations require the use of a child safety seat for seating a young child in a vehicle. The seatbelt of the vehicle can be used to secure the child safety seat, which is more adapted to provide protection for the young child.

The child safety seat assembly can include a child seat, and a base connected underneath the child seat. To facilitate the use of the child seat, attachment mechanisms may be provided to allow removable installation of the seat with the base or a stroller frame. However, the current designs of the attachment mechanisms may not be convenient to operate, and relatively complex in construction.

Therefore, there is a need for a child safety seat that can be convenient to operate and address at least the foregoing issues.

SUMMARY

The present application describes a child safety seat that can be conveniently attached with different types of carrier structures, such as a base and a stroller frame. In one embodiment, the child safety seat comprises a seat shell, two first latches, two second latches and a release handle. The seat shell has two protruding rails extending at an underside of the seat shell, each of the rails having an inner side surface facing a gap delimited between the two rails, and an outer side surface opposite to the inner side surface. The two first latches are respectively assembled with the two rails, and respectively protrude from the inner side surfaces of the two rails so as to be able to engage with a base. The two second latches are assembled with the two rails at positions adjacently opposite to the first latches, and respectively protrude from the outer side surfaces of the two rails so as to be able to engage with a stroller frame. The release handle is operatively connected with the first and second latches at the two rails, and is operable to switch the first and second latches from a locking state to an unlocking state.

BRIEF DESCRIPTION OF THE DRAWINGS

FIG. 2 is a perspective view illustrating the child safety seat assembly of FIG. 1 in a detached state;

DETAILED DESCRIPTION OF THE EMBODIMENTS

Figure 1:
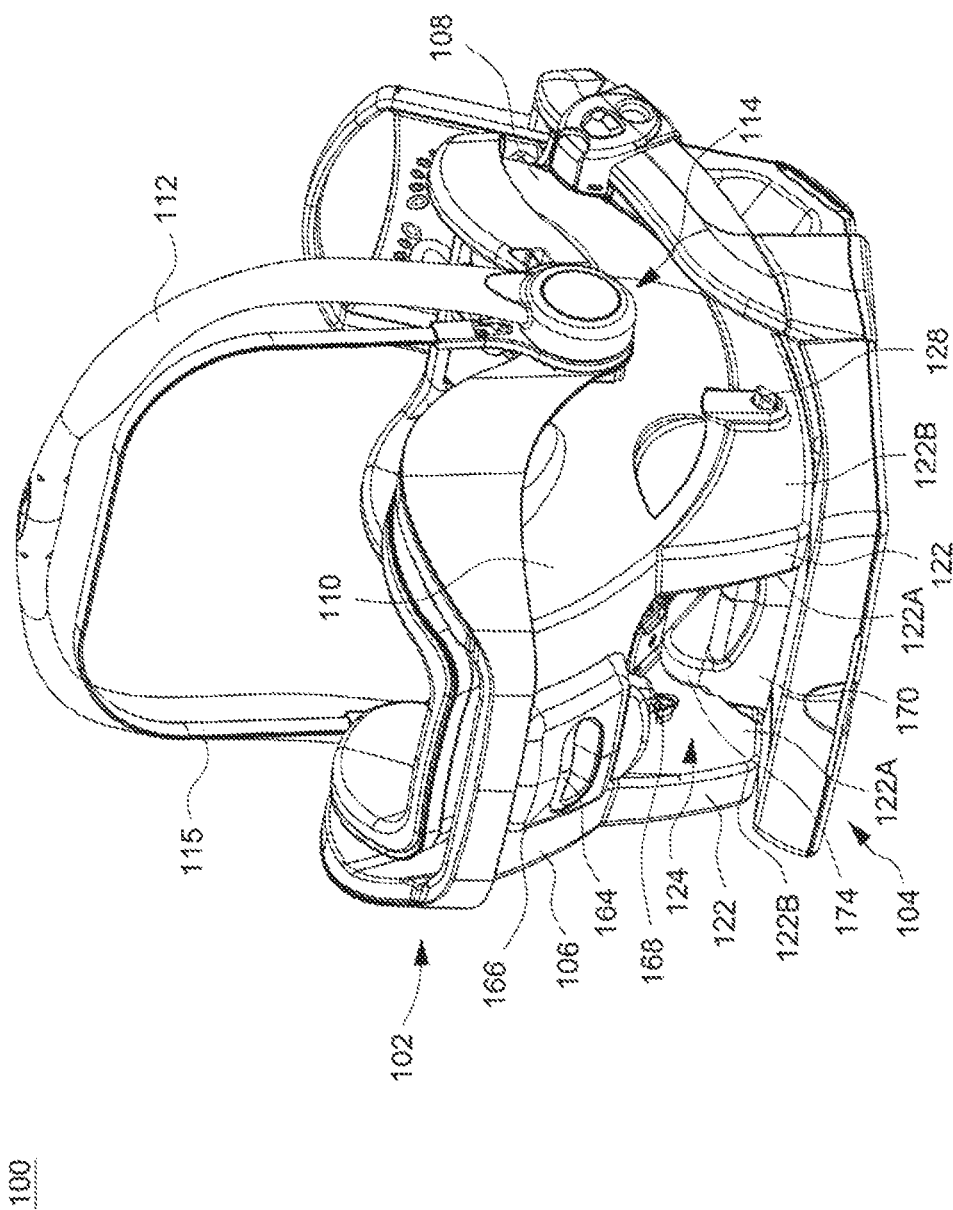
FIG. 1 is a perspective view illustrating an embodiment of a child safety seat assembly.

FIG. 1 is a perspective view illustrating an embodiment of a child safety seat assembly 100, and FIG. 2 is a perspective view illustrating the child safety seat assembly 100 in a detached state. The child safety seat assembly 100 can include a child seat 102 and a base 104. The child seat 102 can include a seat shell 106 having a seat portion 108 and a seatback 110. The seat shell 106, including the seat portion 108 and the seatback 110, can be formed by plastic molding. An underside of the seat shell 106 can include two protruding support rails 122, and a gap region 124 laterally delimited between the two rails 122. Each of the rails 122 can respectively have an inner side surface 122A facing the gap region 124, and an outer side surface 122B opposite to the inner side surface 122A. The rails 122 can be formed at the underside of the seat portion 108, and extend to the rear of the seatback 110. For facilitating portability of the child seat 102, a carrying handle 112 can be mounted with left and right sides of the seat shell 106 via two pivot connections 114. A canopy frame 115 may also be assembled with the seat shell 106 to provide shielding for a child.

Figure 10:
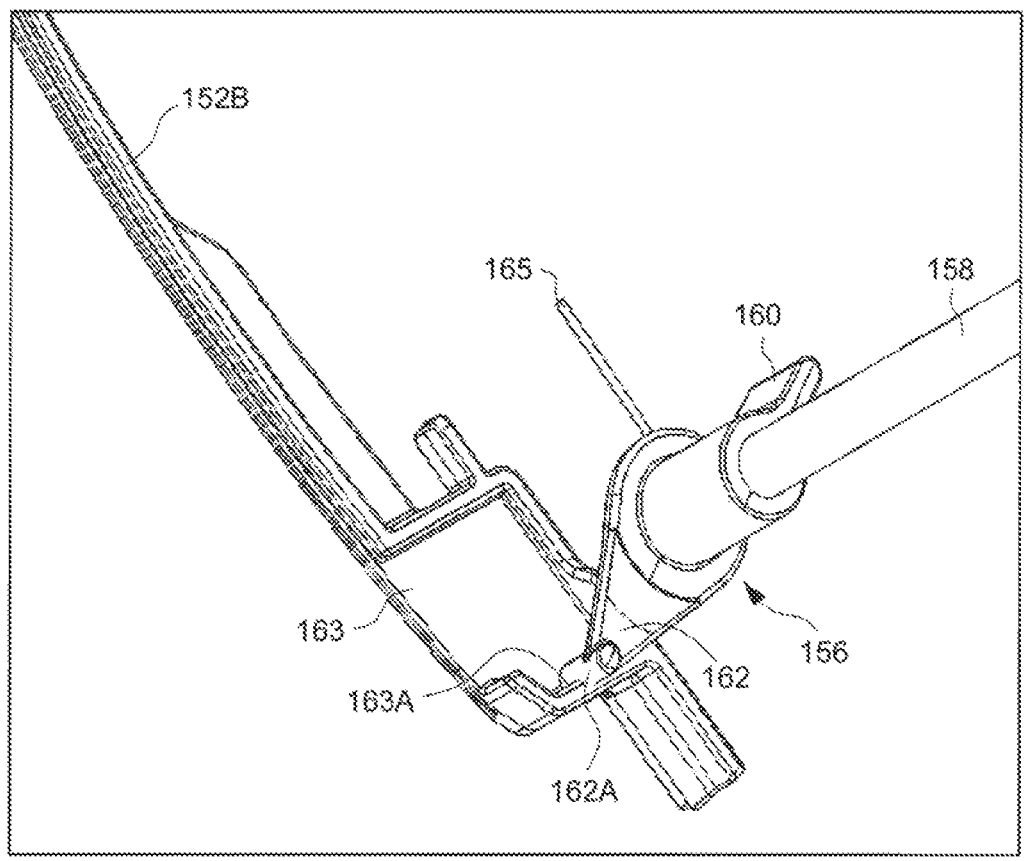
FIG. 10 is a schematic view illustrating the connection of a latch with a second segment of the elongated member.
Figure 11:
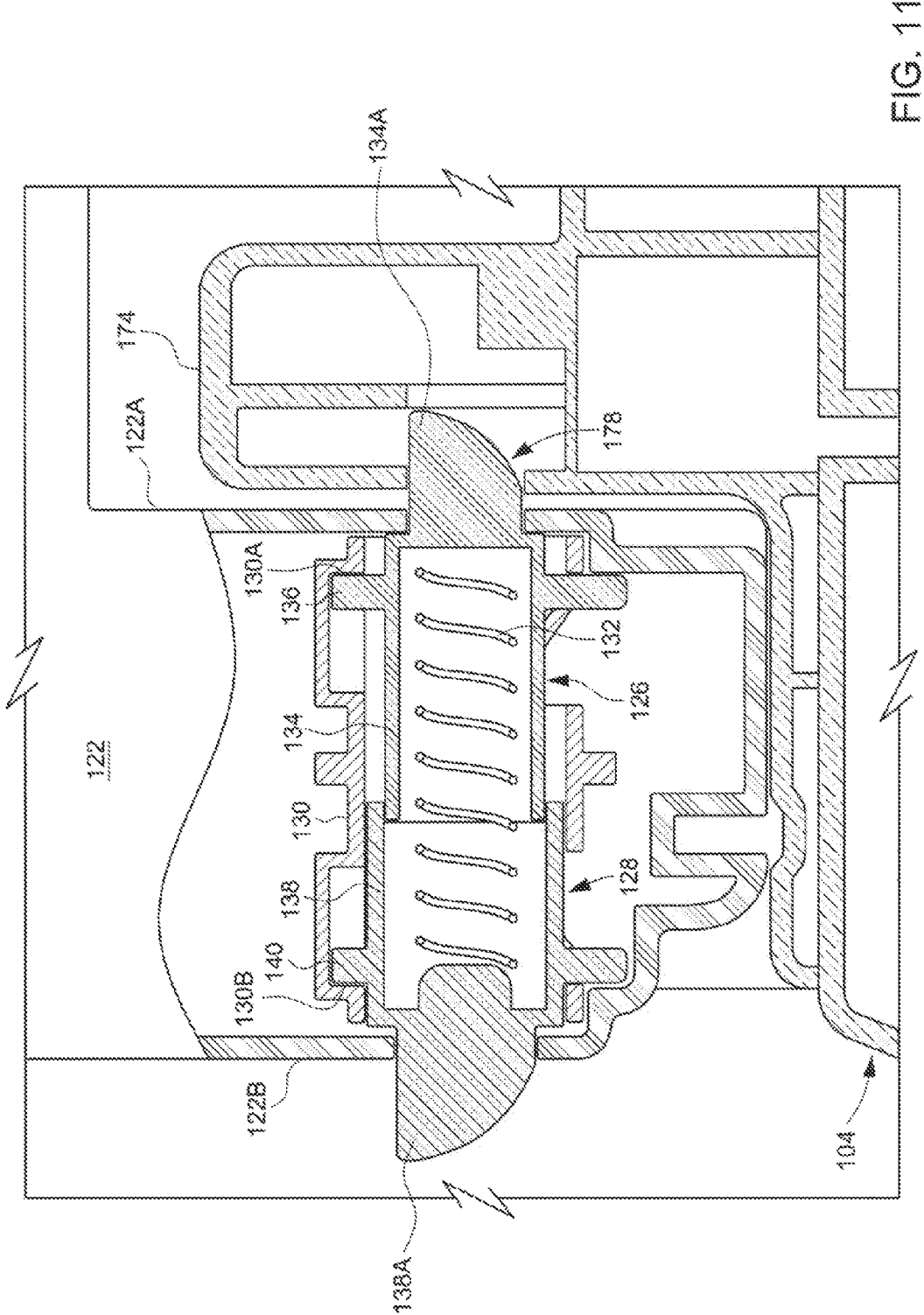
FIG. 11 is a partial cross-sectional view illustrating the latching unit engaged with a base.
Figure 12:
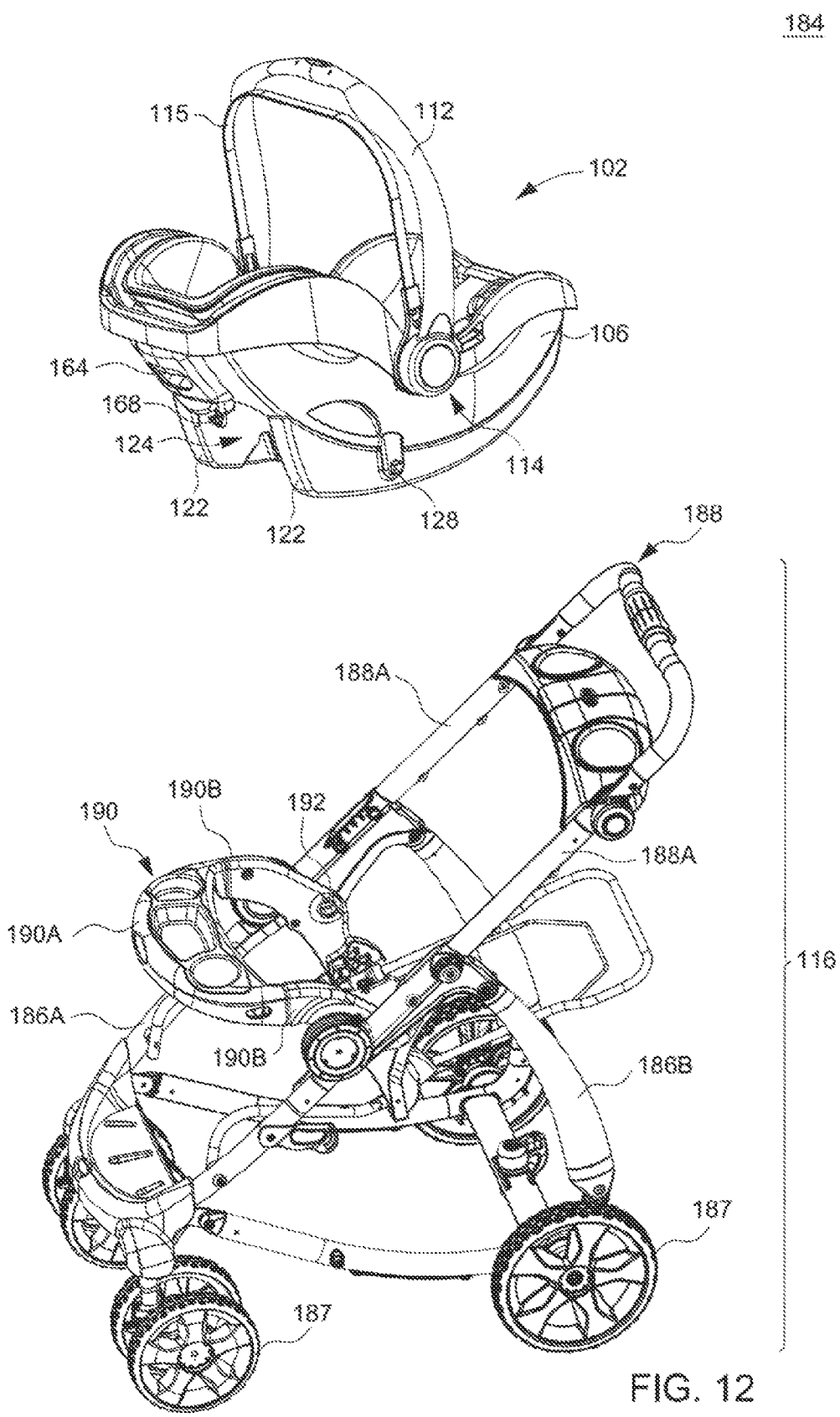
FIG. 12 is a schematic view illustrating an embodiment of a child safety seat assembly in which the child seat can be used in association with a stroller frame.
Figure 13:
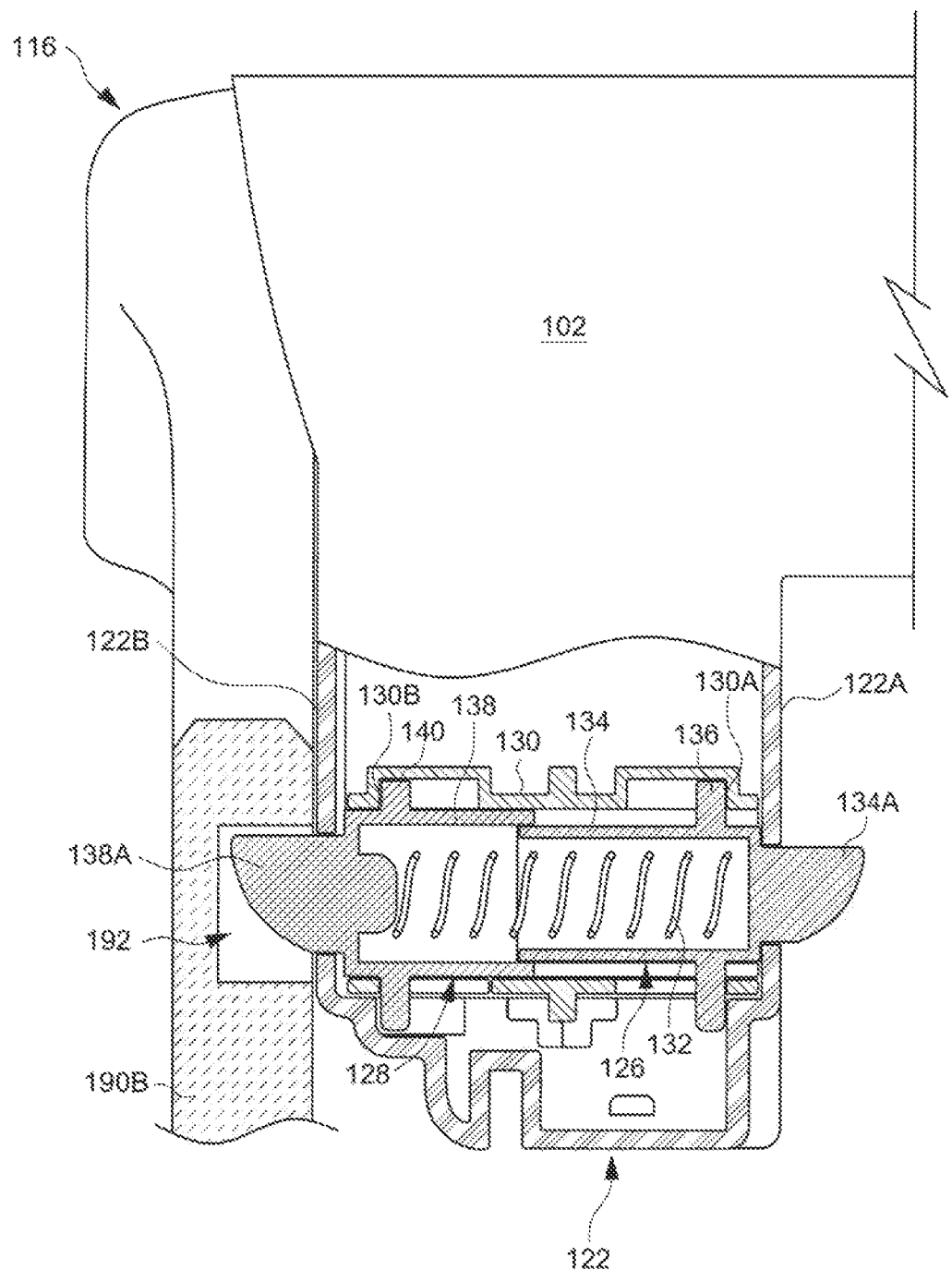
FIG. 13 is a partial cross-sectional view illustrating the latching unit engaged with the stroller frame.

The child seat 102 can be removably installed with different support structures, e.g., the base 104 as shown in FIGS. 1 and 11, or a stroller frame 116 as better shown in FIGS. 12 and 13 where it can be used as a seat structure of the stroller apparatus. These different configurations of use can be enabled via an attachment mechanism that can be operable to engage with either of the base 104 and the stroller frame 116. A first embodiment of this attachment mechanism is described hereafter with reference to FIGS. 3-10.

Figure 3:
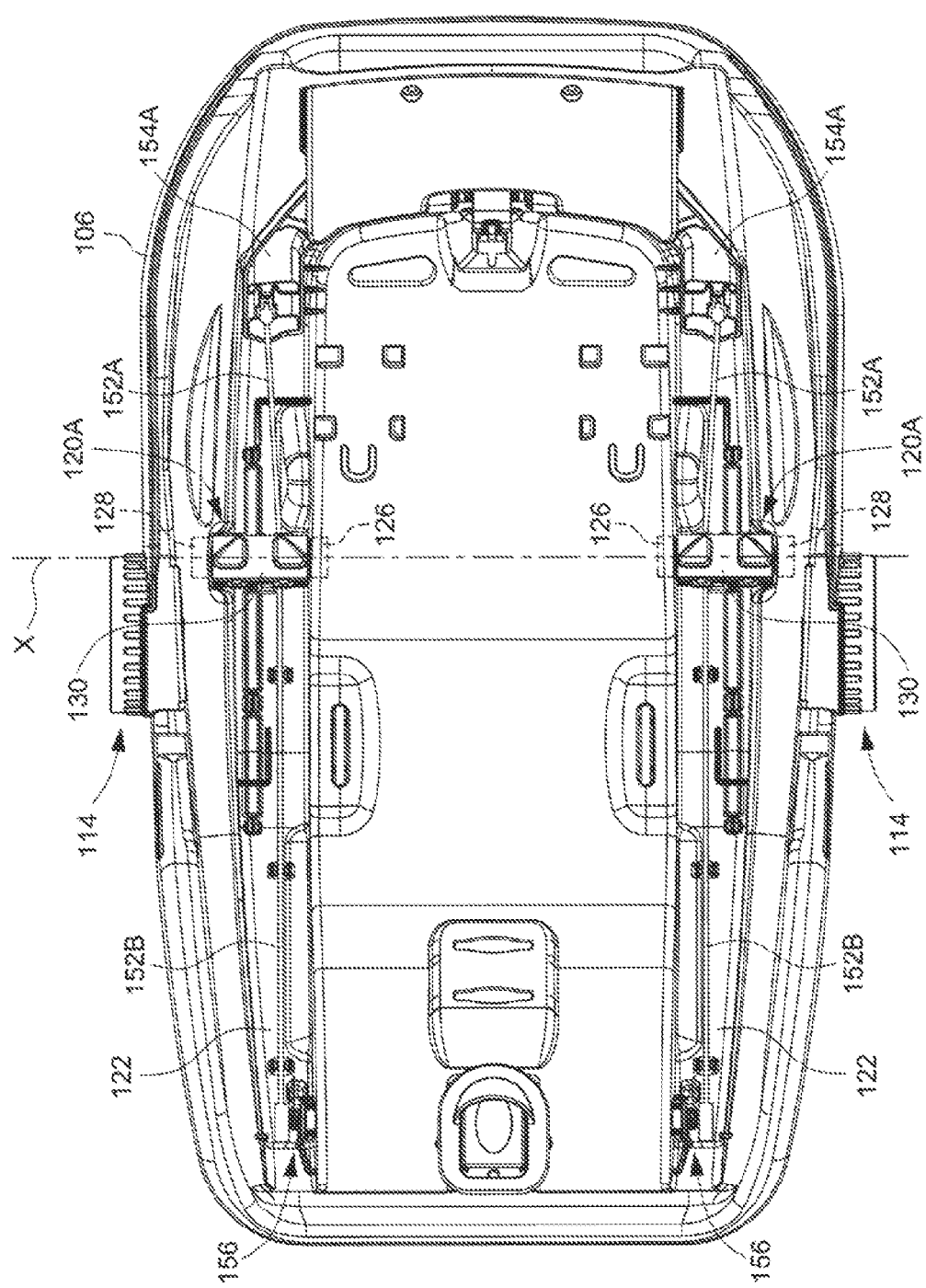
FIG. 3 is a schematic view illustrating the assembly of an attachment mechanism with a seat shell of the child seat shown in FIG. 2.

In conjunction with FIGS. 1 and 2, FIG. 3 is a schematic view illustrating the assembly of an attachment mechanism with the seat shell 106. The attachment mechanism can include two pairs of adjacent latches 126 and 128, two actuating parts 130, and two springs 132 (better shown in FIG. 5). The two pairs of latches 126 and 128 can be respectively assembled in the interior of the two rails 122. In one embodiment, each pair of the latches 126 and 128 can be arranged at a middle region of the associated rail 122 located between the front and the rear of the seat shell 106, e.g., proximate to one pivot connection 114 of the carrying handle 112. The latches 126 and 128, the actuating part 130 and the spring 132 assembled at each rail 122 can form a modular latching unit 120A operable to lock with either of the base 104 and the stroller frame 116 (better shown in FIGS. 12 and 13).

Figure 4:
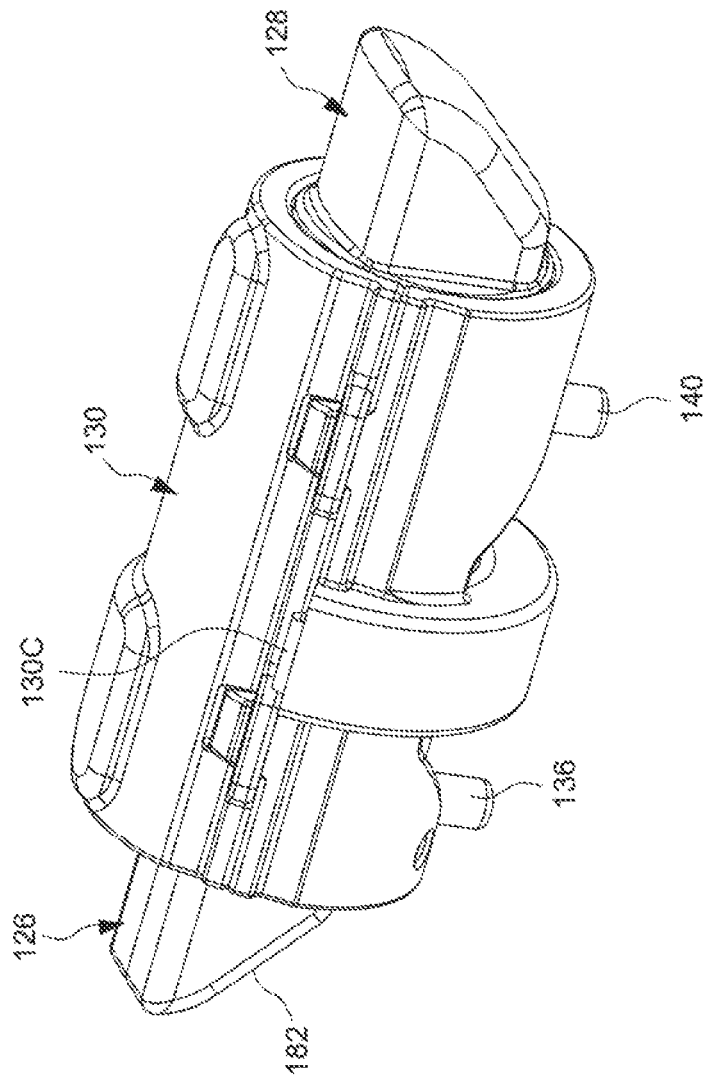
FIG. 4 is a perspective view illustrating a modular latching unit of the attachment mechanism shown in FIG. 3.
Figure 5:
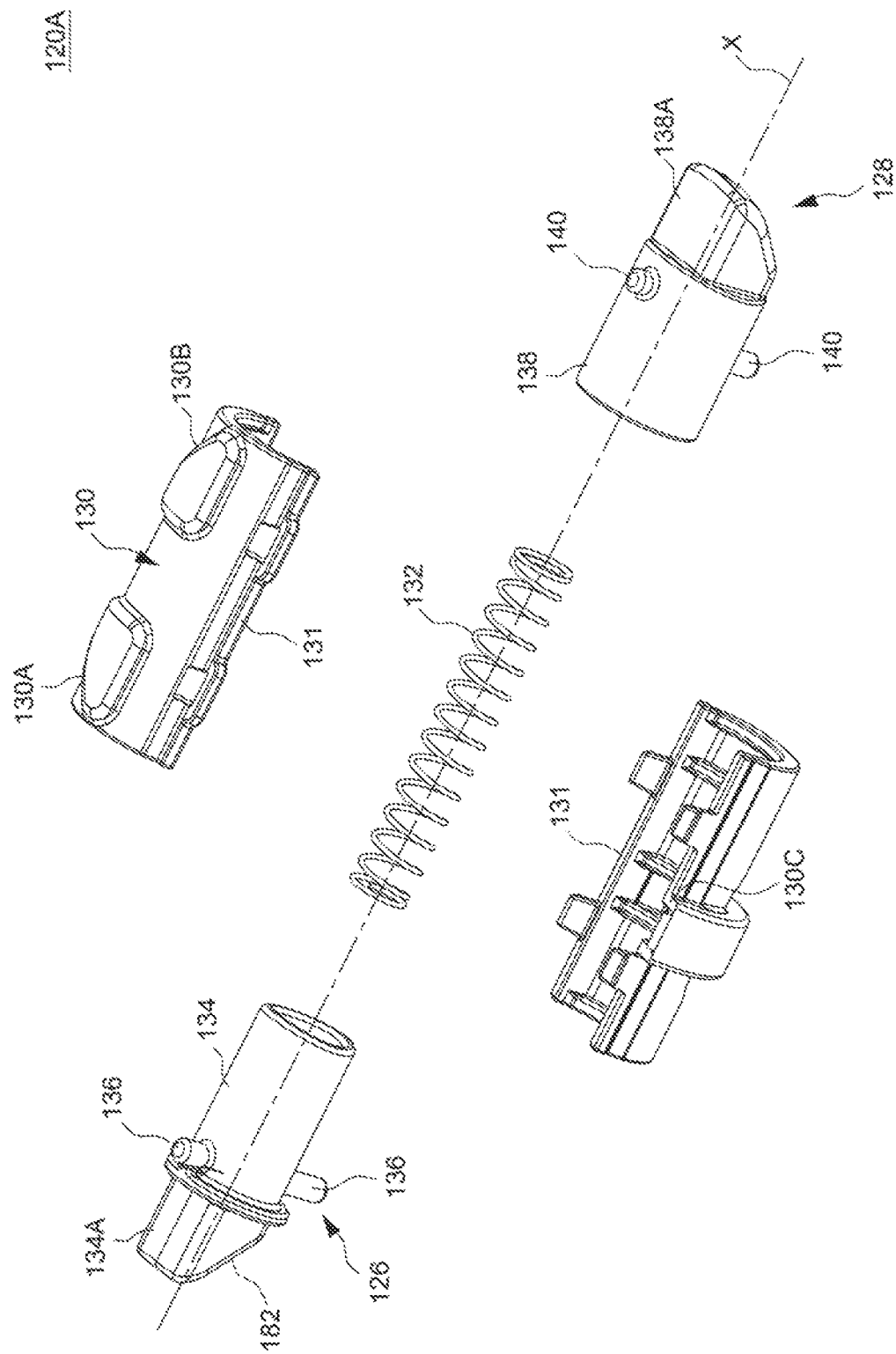
FIG. 5 is an exploded view illustrating the latching unit shown in FIG. 4.

In conjunction with FIG. 3, FIGS. 4 and 5 are respectively perspective and exploded views illustrating the latching unit 120A. The latches 126 of the two latching units 120A can be assembled with the two rails 122 at symmetric positions along a transverse axis X of the seat shell 106. In one embodiment, each of the two latches 126 can have a sleeve-shaped body portion 134 that extends into a distal end 134A adapted to engage with a slot 178 provided on the base 104 (better shown in FIG. 2). An outer surface of the latch 126 can also include one or more protruding stud 136 that is movably connected with the associated actuating part 130. As shown in FIG. 5, the latch 126 can be exemplary provided with two studs 136 at two opposite sides. The latches 126 can be disposed so as to be movable along the transverse axis X relative to the rails 122. In particular, the latches 126 may be operable to protrude or retract from the inner side surfaces 122A of the two rails 122 to respectively engage with or disengage from the base 104.

The latches 128 of the two latching unit 120A can be movably assembled with the two rails 122 at positions that are symmetric to each other along the transverse axis X of the seat shell 106, and are adjacent to the latches 126 and oriented in an opposite direction. In one embodiment, each of the two latches 128 can also have a shape similar to that of the latch 126, including a sleeve-shaped body portion 138 that extends into a distal end 138A adapted to engage with a recess structure provided on the stroller frame 116 (better shown in FIGS. 12 and 13). An outer surface of the latch 128 can also include one or more protruding stud 140 that is movably connected with the associated actuating part 130. As shown in FIG. 5, the latch 128 can be exemplary provided with two studs 140 at two opposite sides. The latches 128 can be disposed so as to be movable relative to the rails 122 along the transverse axis X and in directions opposite to the latches 126. In particular, the latches 128 may be operable to protrude or retract from the outer side surfaces 122B of the two rails 122 to respectively engage with or disengage from the stroller frame 116.

In one embodiment, each of the actuating parts 130 can be pivotally mounted with the seat shell 106 about a pivot axis that is substantially parallel to an axis of displacement of the first and second latches 126 and 128. For example, each actuating part 130 can be constructed by the assembly of two covers 131 to form an elongated sleeve that is parallel to or centered on the transverse axis X, and has a hollow interior in which the associated latches 126 and 128 can be movably assembled adjacent to each other. The actuating part 130 can be pivotally coupled with one associated rail 122 so that the actuating part 130 is rotated relative to the seat shell 106 about a pivot axis which can be parallel and aligned with the transverse axis X, or extend transversally parallel to and spaced apart from the transverse axis X. Moreover, each actuating part 130 can also include symmetric cam surfaces 130A and 130B against which the studs 136 and 140 of the associated latches 126 and 128 can movably contact, respectively. The cooperation between the cam surfaces 130A and 130B and the studs 136 and 140 can convert rotating displacements of the actuating part 130 into displacements of the associated latches 126 and 128 either away or toward each other along the transverse axis X, and reversely.

Each of the springs 132 can be disposed between the associated pair of latches 126 and 128 at each rail 122, and can be deformable along the transverse axis X of the seat shell 106. In particular, the spring 132 can have a first end that is received in the body portion 134 and connects with its associated latch 126, and a second end that is received in the body portion 138 and connects with its associated latch 128. Each spring 132 can stretch for biasing the associated latches 126 and 128 to a locking state, and contract when the latches 126 and 128 are switched to an unlocking state. Moreover, the biasing action applied by the spring 132 can keep the studs 136 and 140 of the associated latches 126 and 128 in contact with the cam surfaces 130A and 130B of the actuating part 130.

Figure 6:
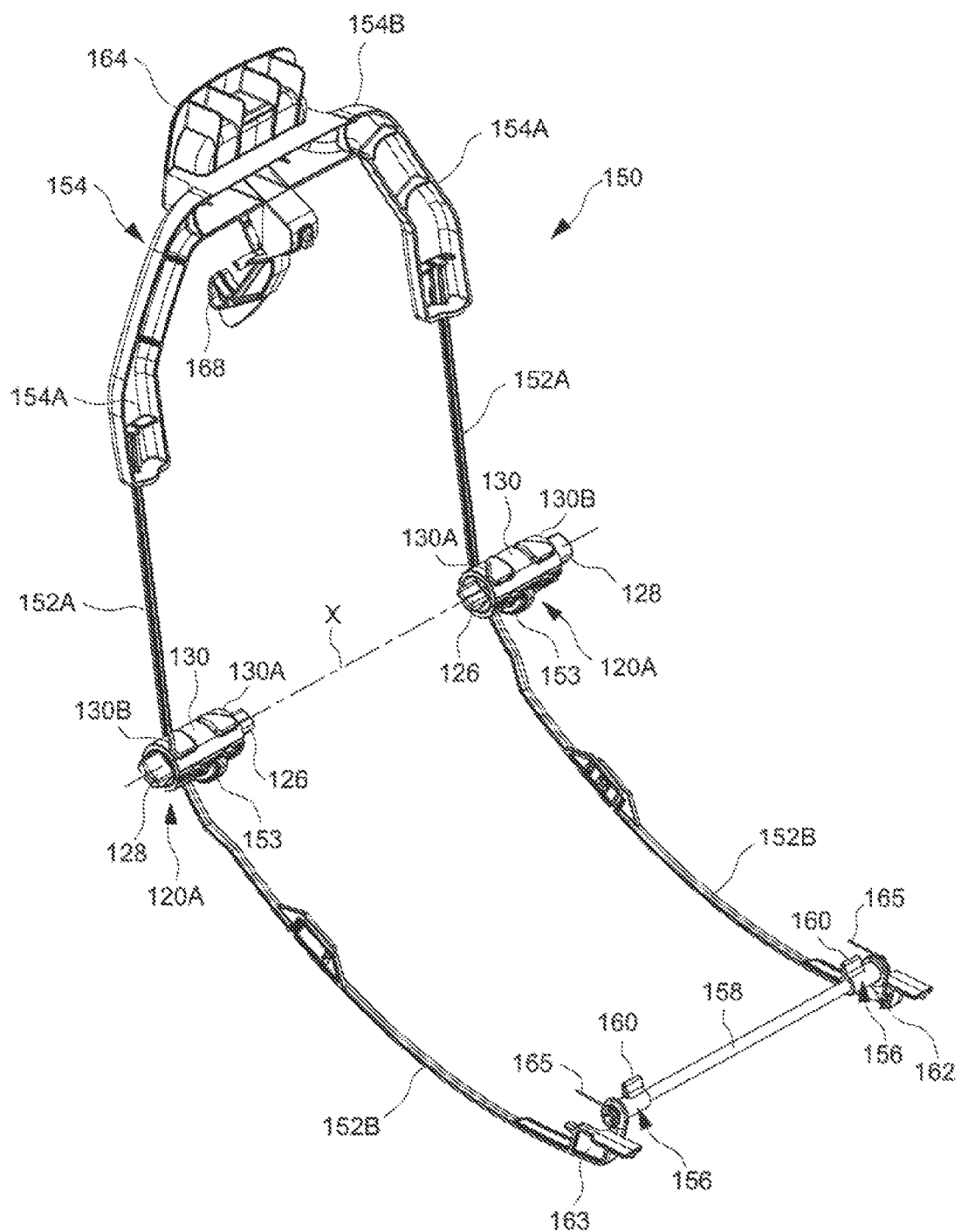
FIG. 6 is a schematic view illustrating the construction of a release mechanism operable to unlock the latching units shown in FIGS. 4 and 5.

FIG. 6 is a schematic view illustrating the construction of a release mechanism 150 operable to unlock the latching units 120A. The release mechanism 150 can include two elongated members 152 and a release handle 154. The elongated members 152 may be formed as cables or curved strips that are respectively disposed along the rails 122. Each elongated member 152 can have a first segment 152A connected with the release handle 154 and one associated actuating part 130.

Figure 7:
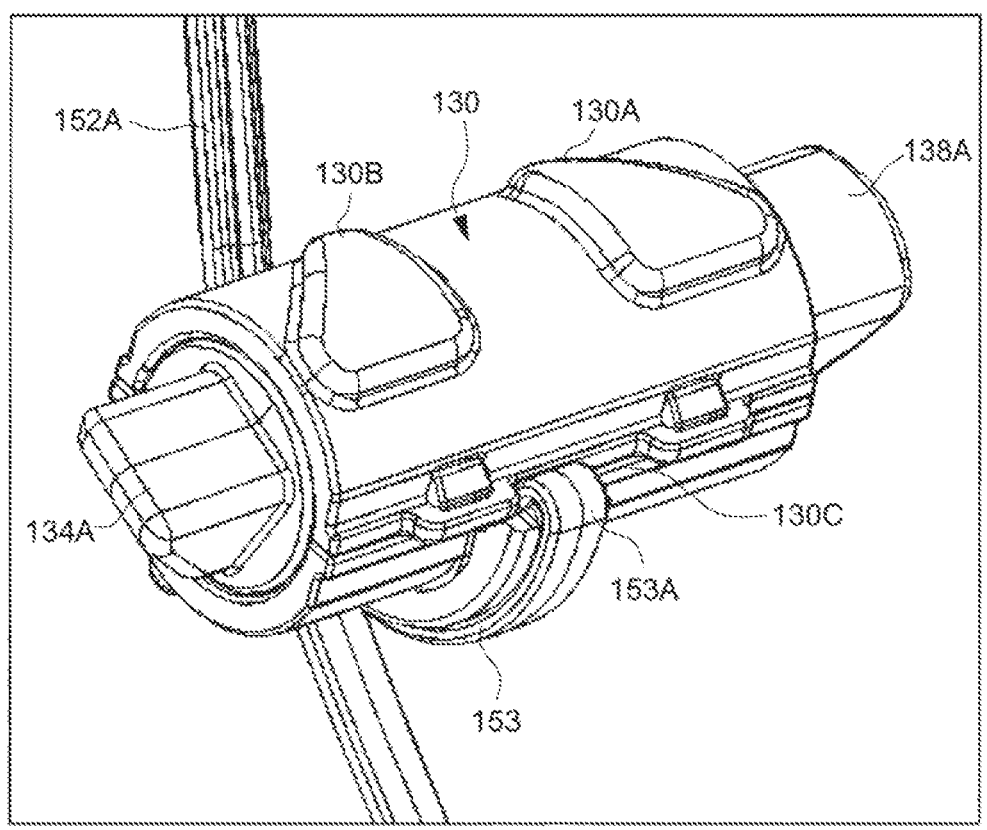
FIGS. 7 and 8 are schematic enlarged views illustrating the connection of an elongated member with one latching unit.
Figure 8:
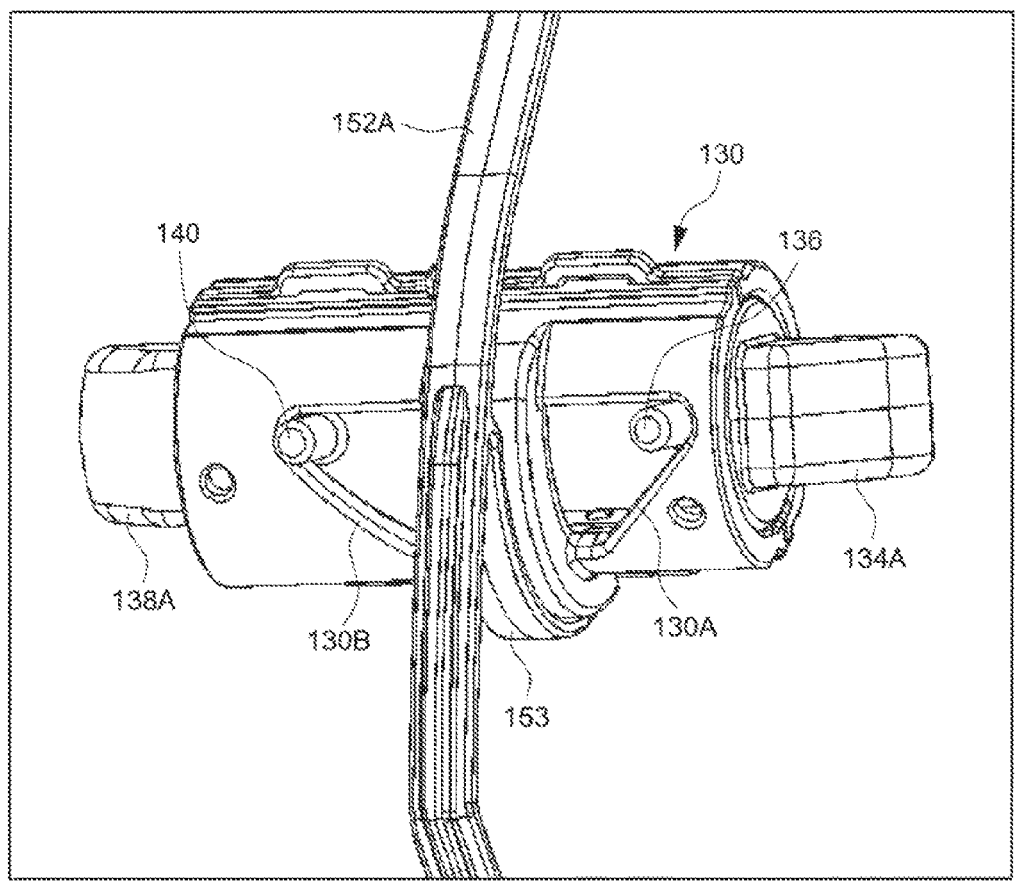
Figure 9:
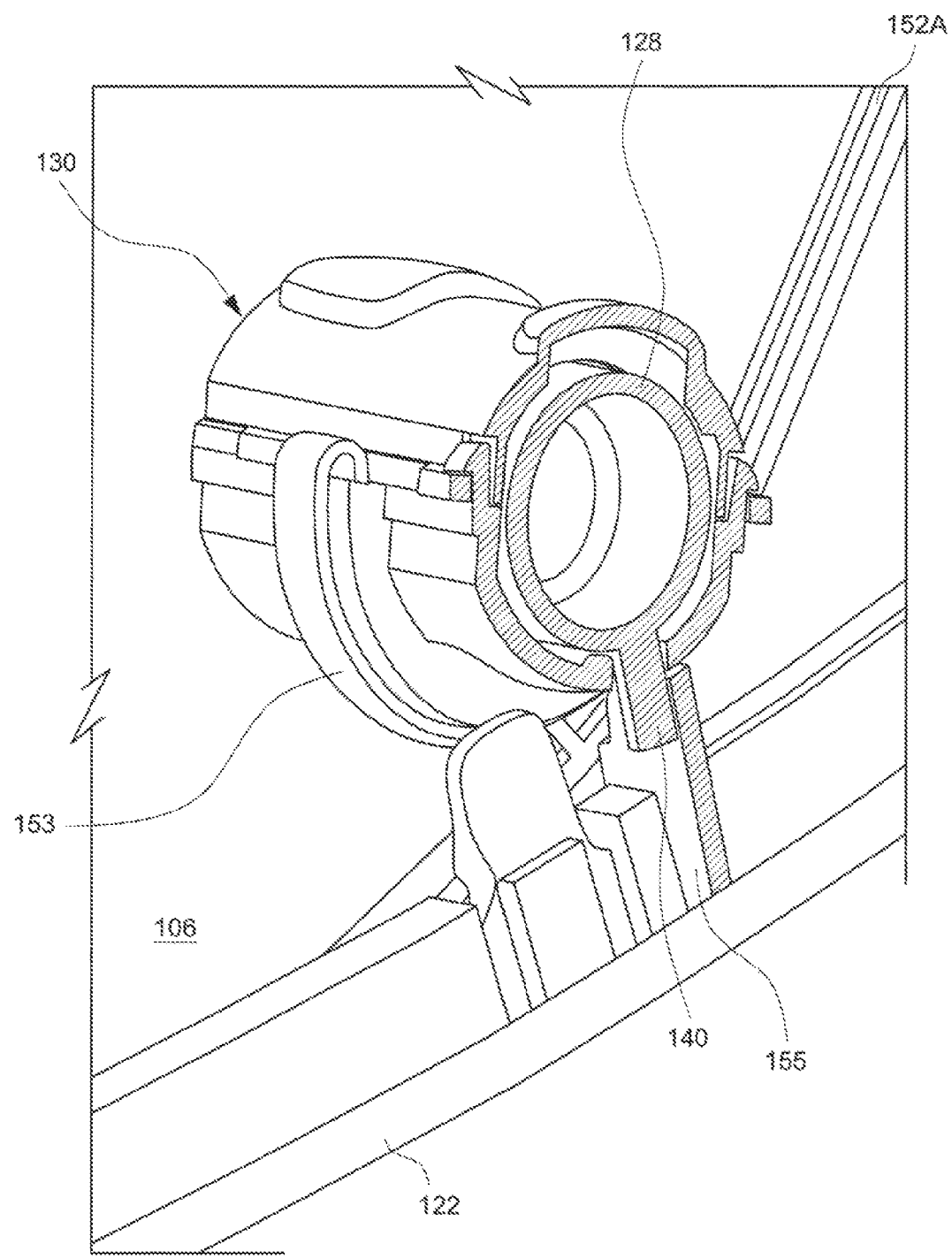
FIG. 9 is a partial cross-sectional view illustrating the assembly of one latching unit inside the seat shell.

FIGS. 7 and 8 are schematic views illustrating the connection of each elongated member 152 with one latching unit 120A. The elongated member 152 can exemplary be made of plastics, and can include an arm 153 extending forward. The arm 153 can be integrally formed with the elongated member 152. The arm 153 can have an arc shape that wraps at least partially around the actuating part 130 of the latching unit 120A from the underside. An end portion of the arm 153 can form a catch 153A that engages with a flange 130C of the actuating part 130. When the elongated member 152 is pulled upward, the arm 153 can drive rotation of the actuating part 130 about the axis X.

In conjunction with FIGS. 4-8, FIG. 9 is a partial cross-sectional view illustrating the assembly of the latching unit 120A inside the seat shell 106. The latching unit 120A can assembled in the rail 122 with the actuating part 130 pivotally installed. One or more of the studs 136 and 140 (for example, the stud 140 protruding downward) may be in contact with a sidewall portion 155 affixed with the seat shell 106. In one embodiment, the sidewall portion 155 may be formed integral with the seat shell 106 as a rib protruding upward, and located adjacently behind the stud 140. The abutment between the sidewall portion 155 and the stud 140 can block rotation of the latches 126 and 128 about the axis X, so that rotation of the actuating part 130 around the axis X can be effectively converted into opposite sliding displacements of the latches 126 and 128 along the axis X.

Aside the foregoing structure, other constructions may be implemented to prevent rotation of the latches 126 and 128 around the axis X. For example, the end 138A of the latch 128 can have a polygonal shape (e.g., square or rectangular shape) that can fit with the shape of the opening through the outer side surface 122B of the rail 122, whereby rotation of the latches 126 and 128 can also be effectively prevented.

Referring again to FIG. 6, each elongated member 152 can also include a second segment 152B that extends from first segment 152A at the front of the latching unit 120A and connects with an additional latch 156 disposed adjacent to a front of the seat shell 106. In one embodiment, the elongated member 152 comprised of the first and second segment 152A and 152B can be formed in a single piece. The two latches 156 can be respectively pivotally assembled with the seat shell 106 and connected with each other via a transverse rod 158. Each latch 156 can include an eccentric rib 160 that is exposed outside the seat shell 106 adjacent to one inner side surface 122A, and a radial extension arm 162 operatively connected with the distal end of the second segment 152B.

FIG. 10 is a schematic view illustrating the connection of the latch 156 with the second segment 152B of the elongated member 152. The distal end portion of the elongated member 152 can include a side bracket 163 having a recess with an inner driving surface 163A. The arm 162 can include a tip 162A that extends transversally and can be in sliding contact with the driving surface 163A. A torsion spring 165 can be assembled with the latch 156, and can be operable to bias the latch 156 to rotate in a first direction about the lengthwise axis of the transverse rod 158 for turning the latch 156 to a locking position. When the elongated member 152 is pulled upward, the interaction between the tip 162A and the driving surface 163A can drive rotation of the latch 156 in an opposite second direction for turning the latch 156 to an unlocking position.

Referring again to FIG. 6, the release handle 154 can be mounted to move relative to the seat shell 106 generally along the axis of the seatback 110. As shown, the release handle 154 can have a generally U-shape including two side arms 154A respectively connected with the first ends of the two elongated members 152, and a transverse segment 154B connected between the two side arms 154A. The transverse segment 154B can include a grip 164 that is mounted through an opening 166 (better shown in FIG. 1) formed at the rear of the seatback 110 for facilitating operation of the release handle 154. The release handle 154 can be operable to drive movements of the elongated members 152 along the interior of the rails 122, which in turn drive unlocking rotation of the latches 156. The displacement of the elongated members 152 along the interior of the rails 122 can also drive rotating displacements of the actuating parts 130 about the transverse axis X, which in turn drive the latches 126 and 128 at each rail 122 to move toward each other along the transverse axis X to compress the associated spring 132. The latches 126 and 128 can thereby move to an unlocking state.

As shown in FIG. 6, the release handle 154 can also be connected with an anchor latch 168 adapted to attach with a stroller frame. In one embodiment, the anchor latch 168 may be a spring-biased latch of a hook shape that is pivotally assembled at a central region on the rear of the seat shell 106.

Referring again to FIG. 2, the base 104 can include a raised platform 170 on which the child seat 102 can be installed. The raised platform 170 can be disposed at an upper side of the base 104, and can include two protruding coupling portions 174 that extend parallel in a lengthwise direction of the base 104. The coupling portions 174 are symmetric in construction, respectively including grooves 176, and second slots 178 axially spaced apart from the grooves 176. The grooves 176 can be formed as recesses on the upper surfaces of the coupling portions 174 including catches 180 with which the latches 156 of the child seat 102 can come into locking engagement. The slots 178 can be respectively formed at symmetric positions on outer side surfaces 174A of the coupling portions 174 for engaging with the latches 126 of the child seat 102.

Exemplary operation for installing the child seat 102 on the base 104 to form the child safety seat assembly 100 is described hereafter with reference to FIGS. 1-10 and 11, FIG. 11 being a partial cross-sectional view illustrating the latching unit 120A engaged with the base 104. The child seat 102 can be installed on the base 104 with the rails 122 being placed adjacent to the two outer side surfaces 174A of the coupling portions 174. As the child seat 102 is placed on the base 104, the latches 156 can engage with the catches 180 in the grooves 176, whereas the latches 126 can be respectively biased by the springs 132 to engage with the slots 178 as shown in FIG. 11.

As shown in FIGS. 4 and 5, the distal ends 134A of the latches 126 can have angled edges 182 that are facing downward for facilitating the engagement of the latches 126 with the slots 178. As the child seat 102 is installed on the base 104, the platform 170 can push against the angled edges 182 to cause the latches 126 to automatically retract toward the interior of the rails 122 and compress the springs 132. Once the latches 126 are respectively aligned with the slots 178, the springs 132 can push the latches 126 along the transverse axis X to extend outward from the inner side surface 122A and respectively engage with the slots 178. The child seat 102 can be thereby securely held with the base 104, as shown in FIG. 1. While the latches 126 engage and lock with the base 104, the latches 128 can be exposed outward opposite to the latches 126. In one embodiment, the child safety seat assembly 100 as shown in FIG. 1 may be adapted to a configuration of use where the child is facing the rear of a vehicle.

To remove the child seat 102 from the base 104, the release handle 154 can be pulled upward, which cause the elongated members 152 to slide along the rails 122 and drive rotation of the latches 156 and actuating parts 130. As a result, the latches 156 at the front of the seat shell 106 can unlock from the catches 180. Meanwhile, owing to the cooperation of the studs 136 and 140 with the cam surfaces 130A and 130B and the interaction of the studs 140 with the sidewall portions 155, each of the actuating parts 130 can drive the associated latches 126 and 128 to move toward each other along the transverse axis X and compress the spring 132. Accordingly, the latches 126 can respectively retract toward the interior of the rails 122, and disengage from the slots 178.

FIG. 12 is a schematic view illustrating an embodiment of a child safety seat assembly 184 in which the child seat 102 can be used in association with a stroller frame 116. In one embodiment, the stroller frame 116 can exemplary include front and rear leg frames 186A and 186B, a plurality of wheels 187 mounted at lower ends of the front and rear leg frames 186A and 186B, a U-shaped handle 188 that has left and right side segments 188A pivotally connected with the front and rear leg frames 186A and 186B, and a front guard 190 connected with the handle side segments 188A. The front guard 190 can include a tray portion 190A disposed transversally, and left and right brackets 190B respectively joined with two opposite sides of the tray portion 190A and pivotally connected with the handle side segments 188A. The tray portion 190A and two brackets 190B can define at least partially a space adapted to receive the placement of the child seat 102. Moreover, an inner side surface of each bracket 190B can include a slot 192 for engagement of the latch 128 when the child seat 102 is installed on the stroller frame 116.

In conjunction with FIG. 12, FIG. 13 is a partial cross-sectional view illustrating the latching unit 120A engaged with the stroller frame 116. When the child seat 102 is installed on the stroller frame 116, the latch 168 can engage with an underside of the tray portion 190A. Moreover, owing to the biasing action of the springs 132, the latches 128 can respectively protrude outward from the outer side surfaces 122B of the rails 122 to engage with the slots 192. Accordingly, the child seat 102 can be securely held with the stroller frame 116 at multiple attachment points.

To remove the child seat 102 from the stroller frame 116, the same operation described previously may be conducted. The release handle 154 can be pulled upward, which cause the elongated members 152 to slide along the rails 122 and drive rotation of the latches 156, actuating parts 130 and latch 168. As a result, the latch 168 at the rear of the seat shell 106 can unlock from the tray portion 190A. Meanwhile, owing to the cooperation of the studs 136 and 140 with the cam surfaces 130A and 130B, each of the actuating parts 130 can drive the associated latches 126 and 128 to move toward each other along the transverse axis X and compress the spring 132. Accordingly, the latches 128 can respectively retract toward the interior of the rails 122, and disengage from the slots 192. Being unlocked, the child seat 102 then can be removed from the stroller frame 116.

The embodiments described above provide an attachment mechanism 120 in which a modular latching unit 120A integrating a pair of adjacently opposite latches 126 and 128 can be disposed at each rail 122. This construction can bring certain advantages, e.g., the two latches 126 and 128 of each rail 122 can be driven by a same spring 132, which can result in a reduced amount of component parts and simplify the assembly of the child seat 102. It will be appreciated that other constructions may also be suitable to achieve a modular unit, as illustrated in FIGS. 14-16.

Figure 14:
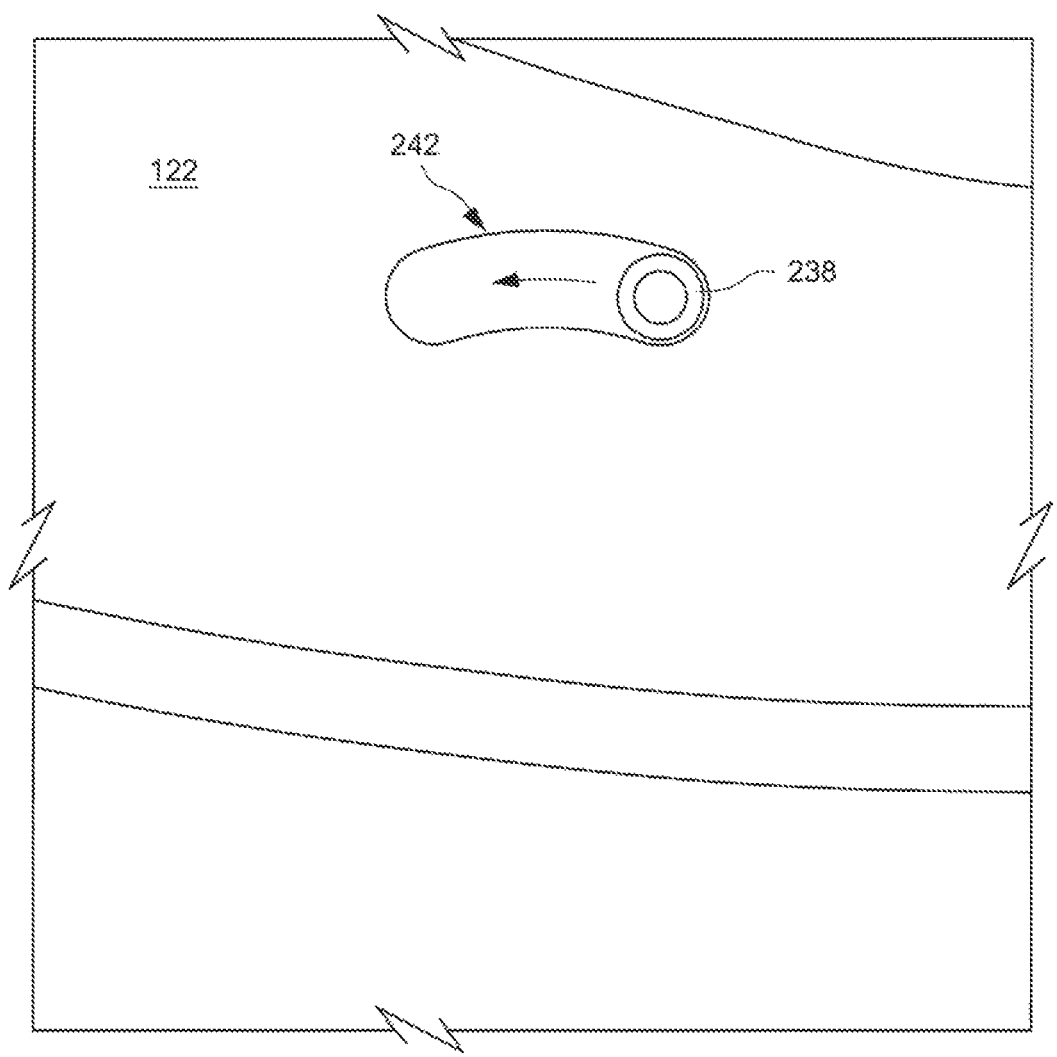
FIGS. 14 and 15 are schematic views illustrating another embodiment of a modular latching unit assembled in the interior of each rail.
Figure 15:
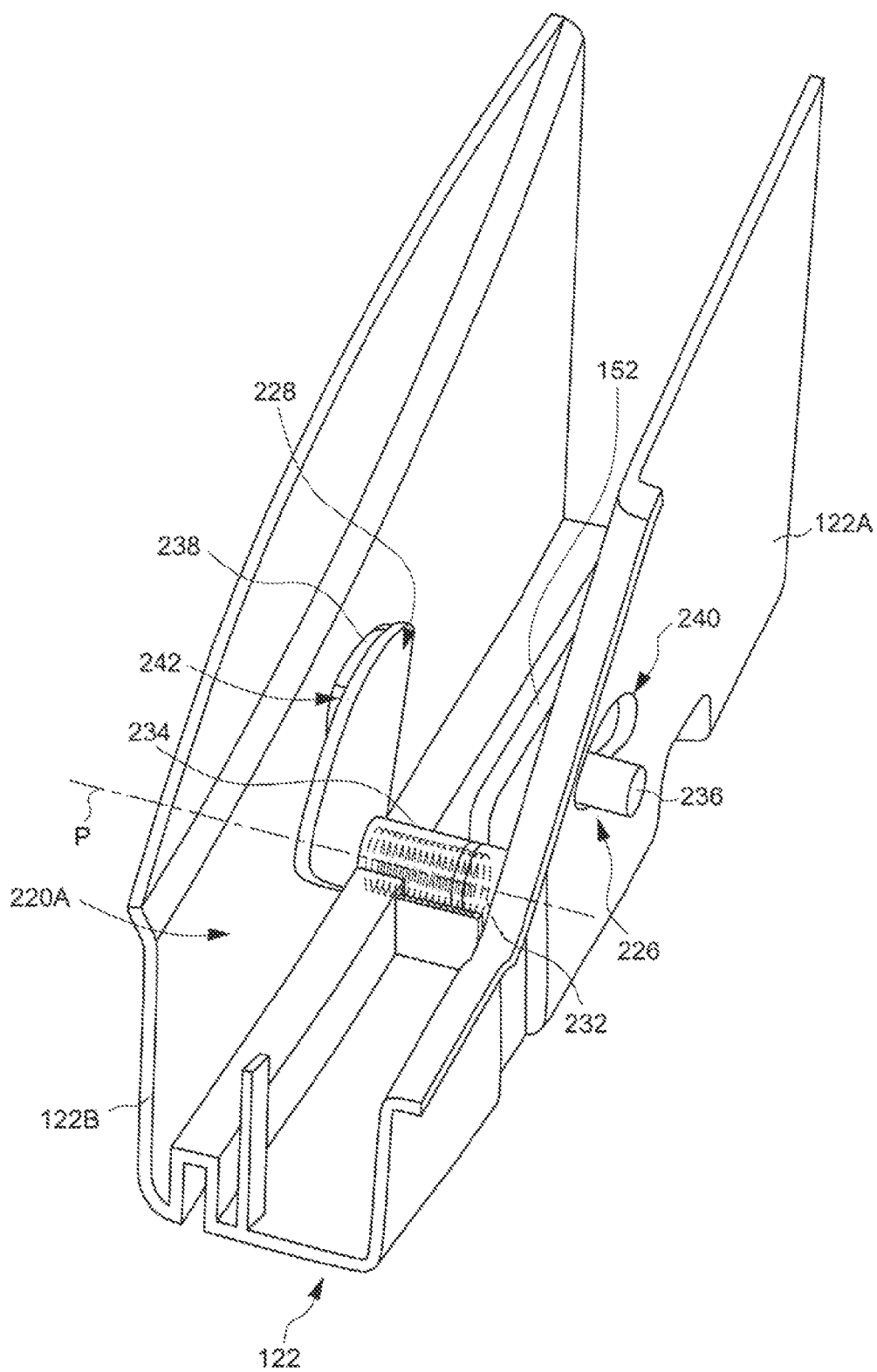
Figure 16:
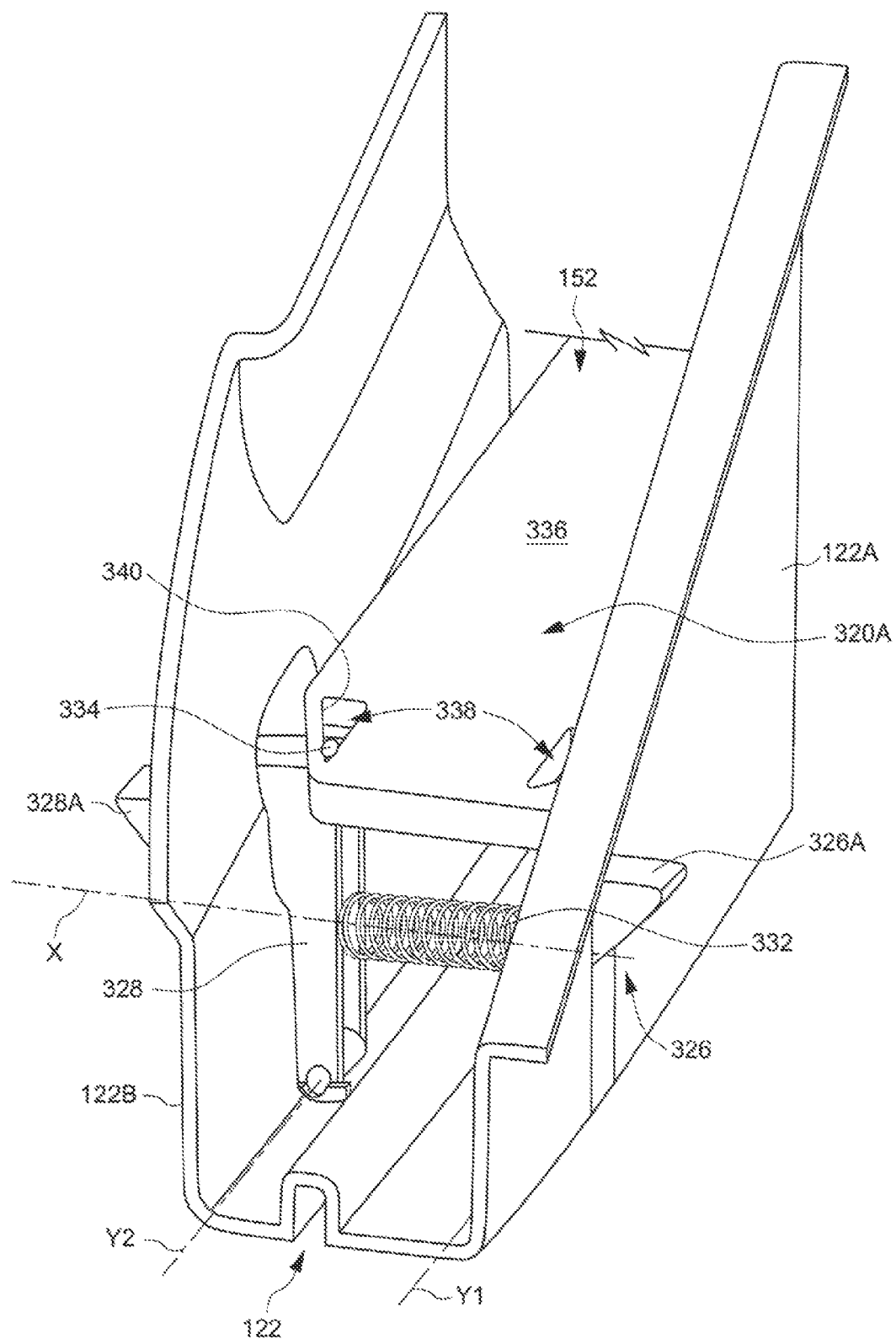
FIG. 16 is a schematic view illustrating another variant embodiment of a modular latching unit assembled in the interior of each rail.

FIGS. 14 and 15 are schematic views illustrating the construction of another modular latching unit 220A assembled in the interior of each rail 122. The modular latching unit 220A can include a pair of adjacently opposite latches 226 and 228, and a spring 232 operatively connected with the latches 226 and 228. The latches 226 and 228 can be disposed substantially aligned with a transverse axis X of the seat shell. The latches 226 and 228 can be pivotally assembled at the rail 122 about a pivot axis P via a shaft portion 234, and respectively include studs 236 and 238 disposed eccentric from the shaft portion 234. The shaft portion 234 can be affixed with the latches 226 and 228, and the pivot axis P can extend in a transverse direction relative to the seat shell 106. The stud 236 can protrude outward from the inner side surface 122A of the rail 122 via a slot 240, and the stud 238 can protrude outward from the outer side surface 122B of the rail via another slot 242.

The spring 232 can be a torsion spring mounted about the shaft portion 234, and have first and second ends respectively connected with the rail 122 and the shaft portion 234. The spring 232 can bias the latches 226 and 228 to rotate in a same direction about the pivot axis P, so that the studs 236 and 238 can respectively travel along the slots 240 and 242 to rotationally shift from the unlocking positions to the locking positions.

The elongated member 152 can be operatively connected with the latches 226 and 228, e.g., at the shaft portion 234. When the release handle 154 (better shown in FIG. 1) is operated, the elongated member 152 can slide along the rail 122 so as to drive reverse rotation of the latches 226 and 228 about the pivot axis P. As a result, the spring 232 can become loaded, and the studs 236 and 238 can respectively travel along the slots 240 and 242 to rotationally shift from the locking positions to the unlocking positions.

Like previously described, the latches 226 can come into locking engagement with an associated structure provided on a base when the child seat is installed on the base, whereas the latches 228 can come into locking engagement with an associated structure provided on a stroller frame when the child seat is installed on the stroller frame.

FIG. 16 is a schematic view illustrating another variant embodiment of a modular latching unit 320A assembled in the interior of each rail 122. The latching unit 320A can include two latches 326 and 328, and a spring 332 connected between the latches 326 and 328. The latches 326 and 328 can disposed adjacently opposite to each other, and substantially aligned with a transverse axis X of the seat shell. The latches 326 and 328 can be pivotally assembled at the rail 122 of the seat shell about two parallel pivot axes Y1 and Y2 spaced apart from each other and extending generally along the rail 122. The latch 326 can include an extension 326A that can protrude outward from the inner side surface 122A of the rail 122, and the latch 328 can include an extension 328A that can protrude outward from the outer side surface 122B of the rail 122. The latches 326 and 328 can be respectively provided with studs 334 protruding upward at the top of the extensions 326A and 328A.

The spring 332 can have two opposite ends respectively connected with the latches 326 and 328. The spring 332 can bias the latches 326 and 328 to rotate in opposite directions about their respective pivot axes Y1 and Y2, so that the extensions 326A and 328A can respectively protrude outward from the inner and outer side surfaces 122A and 122B to the locking positions.

The elongated member 152 can include an actuating portion 336 extending at an upper side of each latches 326 and 328. The actuating portion 336 can include two openings 338 through which the studs 334 can be movably placed. Each opening 338 can have a rim edge that defines a cam surface 340 against which the associated stud 334 rests in movable contact. When the release handle 154 (better shown in FIG. 1) is operated, the elongated member 152 can slide along the rail 122. Owing to the cooperation between the cam surfaces 340 and the studs 334, the elongated member 152 can drive opposite rotations of the latches 326 and 328 about the pivot axes Y1 and Y2 so as to compress the spring 332 and retract the extensions 326A and 326B toward the interior of the rail 122 to the unlocking positions.

Figure 17:
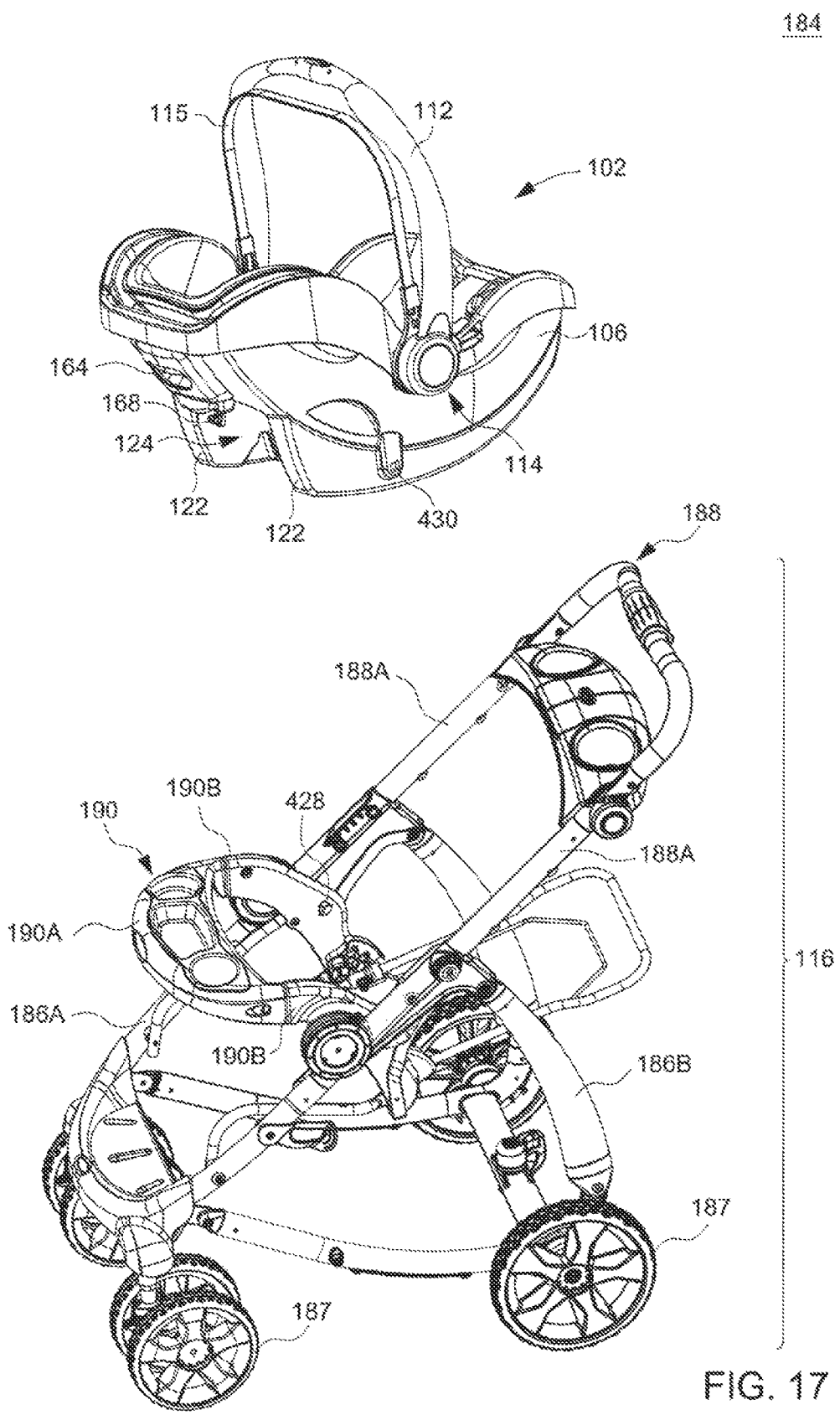
FIG. 17 is a schematic view illustrating another embodiment in which a stroller frame can be provided with spring-biased latches for attachment with a child seat.

While each of the modular latching units described previously integrate two spring-biased latches with the seat shell, alternate embodiments may also have similar constructions of spring-biased latches installed on the carrier or support structure part (e.g., the base or stroller frame). FIG. 17 is a schematic view illustrating another embodiment in which the stroller frame 116 can be provided with spring-biased latches 428 for attachment with a child seat 402. The latches 428 can be respectively disposed on the inner side surfaces of the brackets 190B as replacement of the slots 192 shown in FIG. 12. The child seat 102 in turn can have openings 430 that substitute for the latches 128 shown in FIG. 12.

Figure 18:
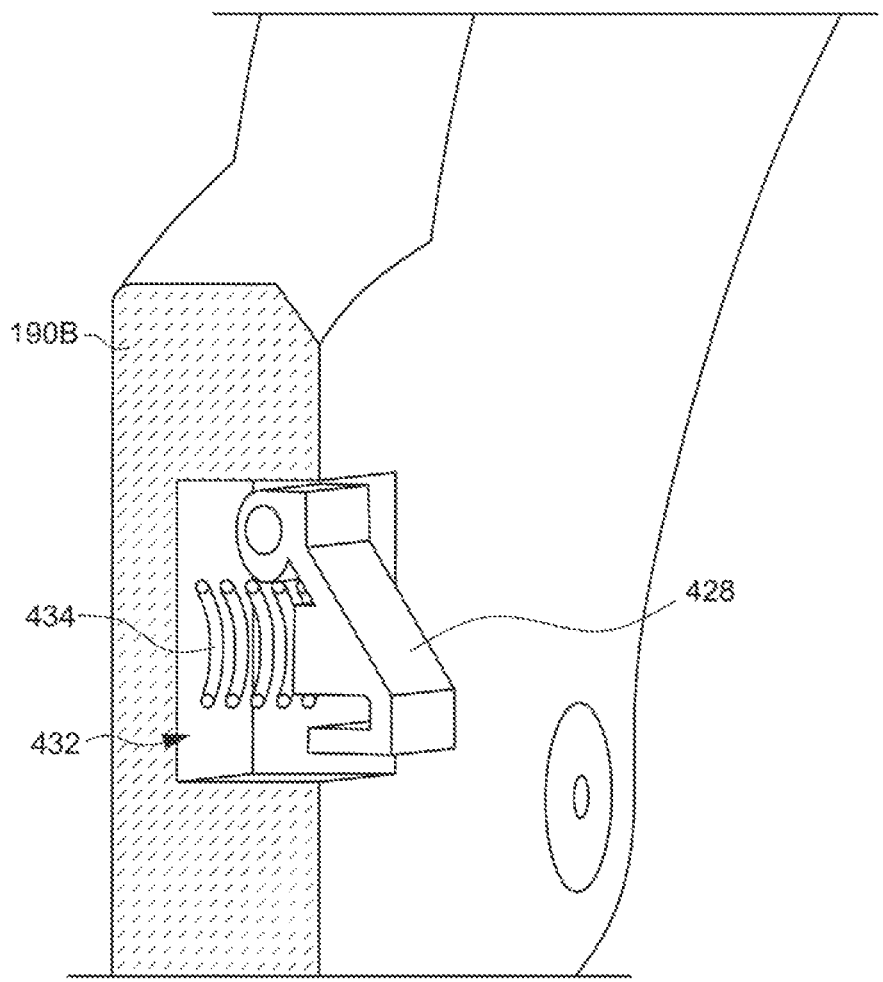
FIG. 18 is a partial cross-sectional view illustrating the assembly of one spring-biased latch with the stroller frame shown in FIG. 17.

FIG. 18 is a partial cross-sectional view illustrating the assembly of one latch 428 with the bracket 190B of the stroller frame 116. The bracket 190B can include a cavity 432 where the latch 428 is pivotally assembled. A spring 434 can be disposed between the latch 428 and an inner sidewall of the cavity 432. The biasing action applied by the spring 434 can push the latch 428 outward so as to engage with the associated opening 430 of the child seat 102 when it is installed on the stroller frame 116. The elongated member in the child seat 402 may have a kicking portion (not shown) that can push the latch 428 out of the opening 430 when the release handle is operated for releasing the child seat 402 from the stroller frame 116.

Figure 19:
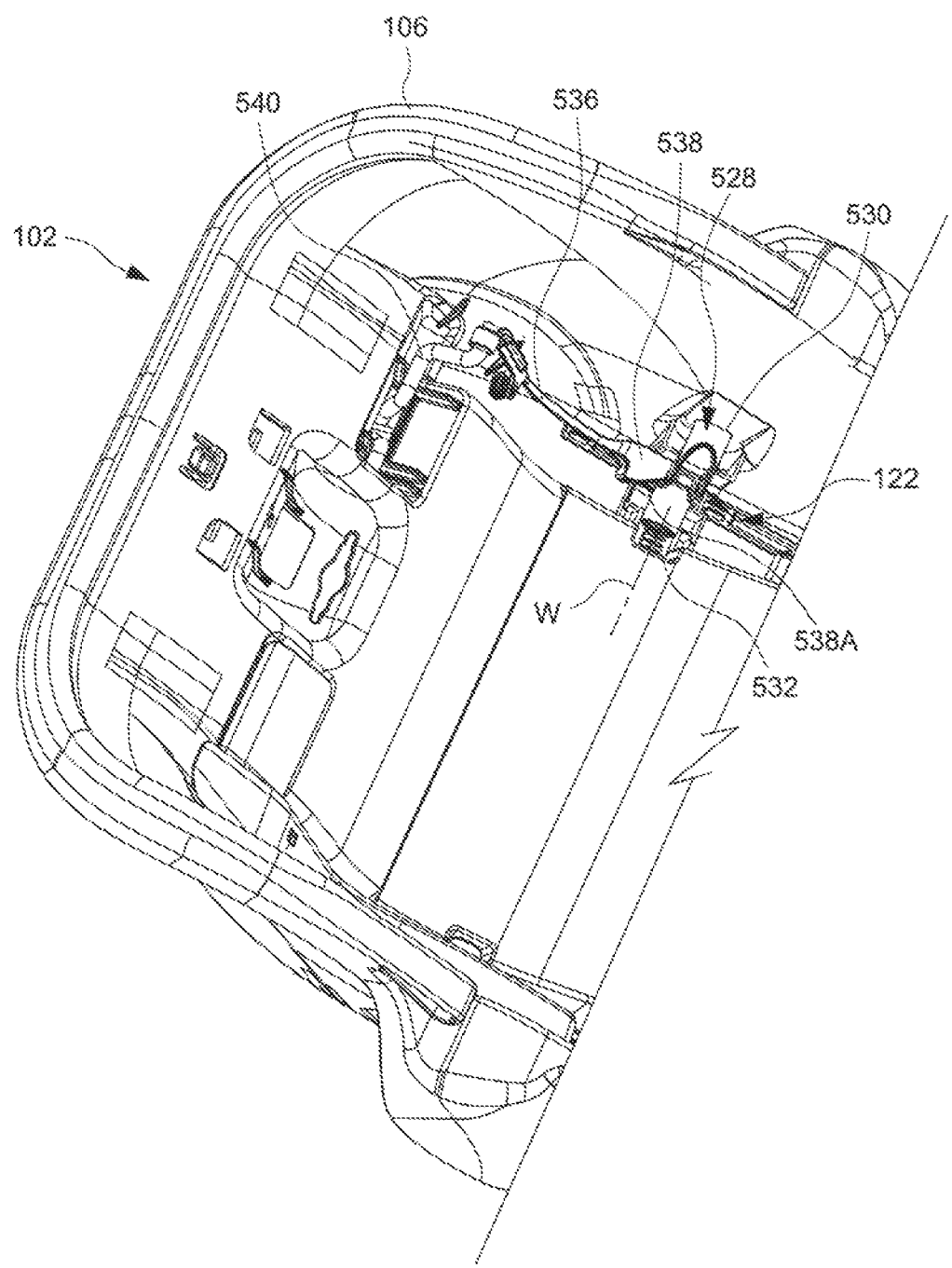
FIGS. 19 and 20 are schematic views illustrating another embodiment of a latch provided in a child seat.
Figure 20:
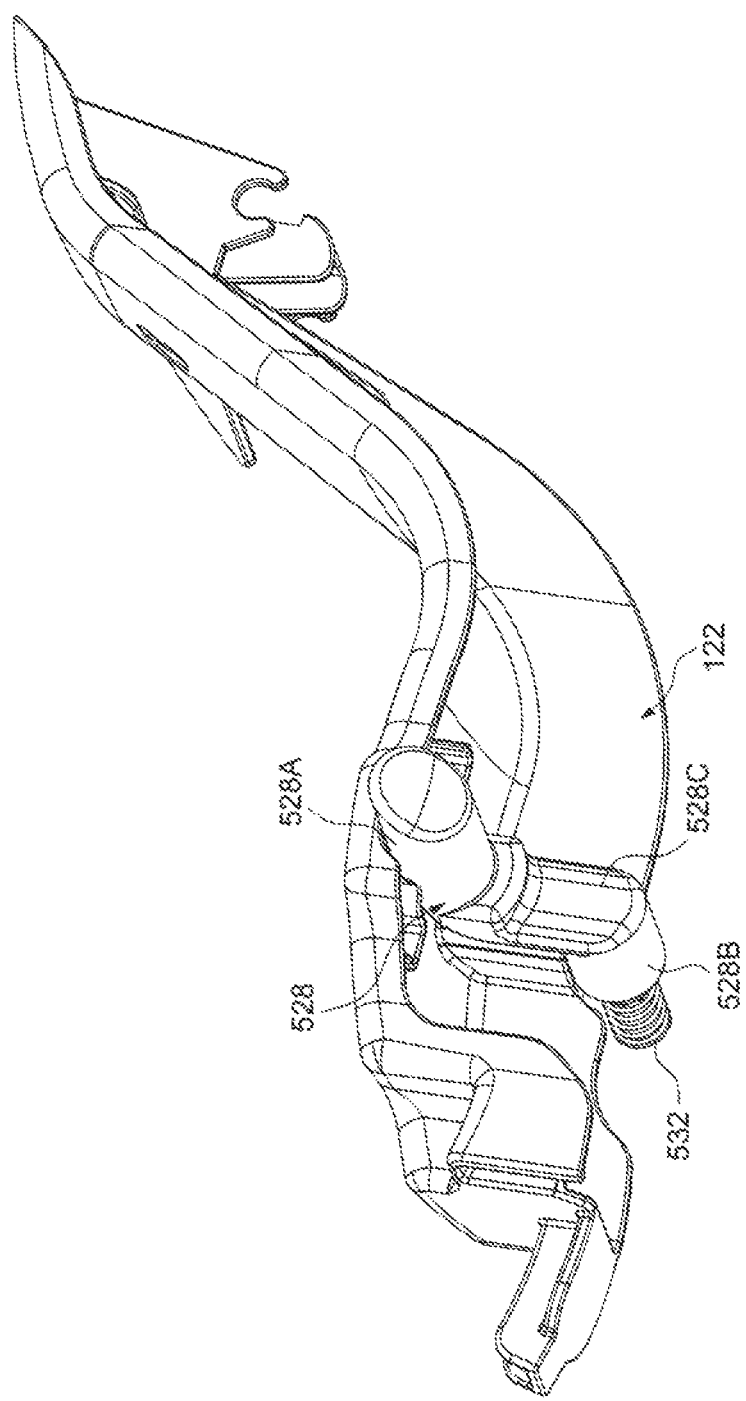

FIGS. 19 and 20 are schematic views illustrating another embodiment of a latch 528 provided in a child seat 102. The latch 528 can be assembled adjacent to one rail 122, and protrude outward through an opening 530 at one side (e.g., outer side) of the rail 122. The latch 528 can be movable along a transverse axis W of the child seat 102. A spring 532 can be disposed between the latch 528 and an inner sidewall of the child seat 102. The spring 532 can bias the latch 528 in a transversal direction to protrude outward for engaging with a support structure, such as the stroller frame shown in FIG. 17.

As shown in FIG. 20, the latch 528 can have an engaging extension 528A, a sleeve portion 528B extending opposite to the engaging extension 528A, and a link portion 528C connected approximately perpendicular with the engaging extension 528A and the sleeve portion 528B. The latch 528 comprised of the engaging extension 528A, the sleeve portion 528B and the link portion 528C can be formed integrally in a single piece. The engaging extension 528A can protrude transversally, and can movably extend outward to engage with the support structure and lock the child seat 102 in place. The spring 532 can be connected with the sleeve portion 528B.

An elongated member 536 (shown in FIG. 19 and omitted in FIG. 20 for clarity) may be disposed along the interior of the rail 122, and can be assembled in sliding contact with the link portion 528C of the latch 528. The elongated member 536 can have an enlarged portion 538 having a cam surface 538A that can be in contact with the link portion 528C. An upper end of the elongated member 536 can be connected with an actuator member 540, which in turn may be connected with a release handle (such as the release handle 154 shown in FIG. 1).

When the elongated member 536 driven by the actuator member 540 moves rearward along the interior of the rail 122, the interaction between the link portion 528C and the cam surface 538A can push the latch 528 to move transversally toward the interior of the child seat 102 to unlock. When the release handle is released, the spring 532 can bias the latch 528 transversally so that the engaging extension 528A can protrude outward.

At least one advantage of the structures described herein is the ability to securely attach the child seat with multiple types of support structures (such as a base and a stroller frame) via latching units that respectively integrate multiple latches. All of the latching units can be controllably driven to unlock concurrently via a release mechanism integrated in the child seat.

Realizations of the child safety seats have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope as defined in the claims that follow.

What is claimed is:

1. A child safety seat comprising:
    a seat shell having two protruding rails extending at an underside of the seat shell, wherein each of the rails has an inner side surface facing a gap delimited between the two rails, and an outer side surface opposite to the inner side surface;
    two first latches respectively assembled with the two rails, the first latches respectively protruding from the inner side surfaces of the two rails and configured to engage with a base;
    two second latches assembled with the two rails at positions adjacently opposite to the first latches, the second latches respectively protruding from the outer side surfaces of the two rails and configured to engage with a stroller frame; and
    a release handle operatively connected with the first and second latches, the release handle being operable to switch the first and second latches from a locking state to an unlocking state.

2. The child safety seat according to claim 1, wherein the first latches and the second latches are substantially aligned with a transverse axis of the seat shell.

3. The child safety seat according to claim 1, wherein the first latches and the second latches are operable to slide along a transverse axis of the seat shell.

4. The child safety seat according to claim 1, wherein each pair of the first and second latches at one same rail is biased by a spring to the locking state.

5. The child safety seat according to claim 4, wherein the spring stretches and contracts along a transverse axis of the seat shell.

6. The child safety seat according to claim 1, wherein the two rails include a first rail and a second rail, at least a pair of the first latch and the second latch at the first rail are assembled with an actuating part that is movably mounted in the rail and operatively connected with the release handle via an elongated member, the actuating part being driven by the release handle to displace the first and second latches to the unlocking state.

7. The child safety seat according to claim 6, wherein the actuating part is pivotally coupled with the seat shell about a pivot axis that is substantially parallel to an axis of displacement of the first and second latches.

8. The child safety seat according to claim 6, wherein the actuating part includes two cam surfaces, and the first and second latches at the first rail include protruding studs that are respectively in sliding contact with the two cam surfaces.

9. The child safety seat according to claim 8, wherein the first and second latches at the first rail are respectively connected with two opposite ends of a spring that is operable to bias the first and second latches at the first rail away from each other to the locking state, the studs being respectively kept in contact with the two cam surfaces by a biasing action of the spring.

10. The child safety seat according to claim 1, wherein the two rails include a first rail and a second rail, at least one pair of the first latch and the second latch at the first rail are pivotally mounted about a pivot axis extending transversally relative to the seat shell, and are connected with a spring operable to rotationally bias the first and second latches at the first rail to the locking state.

11. The child safety seat according to claim 1, wherein the two rails include a first rail and a second rail, the first latch and the second latch at the first rail are pivotally mounted about two spaced-apart pivot axes that extend along the first rail.

12. The child safety seat according to claim 1, further including a carrying handle that is connected with the seat shell via two pivot connections, the first and second latches at each of the two rails being respectively arranged adjacently below one of the two pivot connections.

13. The child safety seat according to claim 1, wherein the release handle is placed at a rear of the seat shell and between the two rails.

14. A child safety seat assembly comprising:
    a base; and
    the child seat according to claim 1 assembled with the base.

15. A child safety seat assembly comprising:
a stroller frame; and
the child seat according to claim 1 assembled with the stroller frame.

16. A child safety seat comprising:
a seat shell having two protruding portions extending at an underside of the seat shell, wherein each of the two protruding portions has an inner side surface facing a gap delimited between the two protruding portions, and an outer side surface opposite to the inner side surface; and
a latching unit assembled with at least one of the two protruding portions, the latching unit including:
a first latch protruding from the inner side surface of the at least one of the two protruding portions and configured to engage with a first support structure; and
a second latch disposed adjacently opposite to the first latch, the second latch protruding from the outer side surface of the at least one of the two protruding portions and configured to engage with a second support structure.

17. The child safety seat according to claim 16, wherein the first and second latches are connected with a spring.

18. The child safety seat according to claim 16, wherein the first and second latches are substantially aligned with a transverse axis of the seat shell.

19. The child safety seat according to claim 16, wherein the first latch and the second latch are assembled with an actuating part that is movably mounted in the at least one of the two protruding portions and operatively connected with a release handle via an elongated member, the actuating part being driven by the release handle to displace the first and second latches to the unlocking state.

20. The child safety seat according to claim 19, wherein the actuating part is pivotally coupled with the seat shell about a pivot axis that is substantially parallel to an axis of displacement of the first and second latches.

21. The child safety seat according to claim 19, wherein the actuating part includes two cam surfaces, and the first and second latches include protruding studs that are respectively in sliding contact with the two cam surfaces.

22. The child safety seat according to claim 21, wherein the first and second latches are respectively connected with two opposite ends of a spring that is operable to bias the first and second latches away from each other to the locking state, the studs being respectively kept in contact with the two cam surfaces by a biasing action of the spring.

23. The child safety seat according to claim 16, wherein the first latch and the second latch are pivotally mounted about a pivot axis extending transversally relative to the seat shell.

24. The child safety seat according to claim 23, wherein the first latch and the second latch are pivotally connected about the pivot axis via a shaft portion, and a torsion spring is mounted about the shaft portion to bias the first and second latches to the locking state.

25. The child safety seat according to claim 16, wherein the first latch and the second latch arranged at the at least one of the two protruding portions are pivotally mounted about two spaced-apart pivot axes that extend along the at least one of the two protruding portions.

* * * * *